United States Patent
Botti et al.

(10) Patent No.: US 9,004,395 B2
(45) Date of Patent: Apr. 14, 2015

(54) DRIVE SYSTEM FOR HELICOPTERS

(71) Applicants: EADS Deutschland GmbH, Ottobrunn (DE); Eurocopter Deutschland GmbH, Donauwörth (DE)

(72) Inventors: Jean Botti, München (DE); Johannes Stuhlberger, Tegernsee (DE); Peter Jänker, Riemerling (DE); Georg Niesl, München (DE); Valentin Klöppel, München (DE)

(73) Assignees: EADS Deutschland GmbH (DE); Airbus Helicopters Deutschland GmbH (DE)

( * ) Notice: Subject to any disclaimer, the term of this patent is extended or adjusted under 35 U.S.C. 154(b) by 0 days.

(21) Appl. No.: 13/679,110

(22) Filed: Nov. 16, 2012

(65) Prior Publication Data

US 2013/0119185 A1    May 16, 2013

Related U.S. Application Data

(63) Continuation of application No. PCT/EP2011/058120, filed on May 19, 2011.

(30) Foreign Application Priority Data

May 19, 2010   (DE) .......................... 10 2010 021 024

(51) Int. Cl.
| | | |
|---|---|---|
| B64C 27/06 | (2006.01) | |
| B64C 27/14 | (2006.01) | |
| B64C 27/12 | (2006.01) | |

(Continued)

(52) U.S. Cl.
CPC ................. *B64C 27/12* (2013.01); *B64C 27/14* (2013.01); *B64C 27/52* (2013.01); *B64C 27/82* (2013.01); *B64D 27/24* (2013.01); *B64C 2027/7283* (2013.01); *Y02T 50/34* (2013.01); *Y02T 50/62* (2013.01)

(58) Field of Classification Search
USPC .......................... 244/17.11, 17.19, 17.21, 56
See application file for complete search history.

(56) References Cited

U.S. PATENT DOCUMENTS

| 1,754,192 A | 4/1930 | Van Vliet |
| 2,378,617 A | 6/1945 | Burke |

(Continued)

FOREIGN PATENT DOCUMENTS

| CH | 422530 A | 10/1966 |
| CN | 1857965 A | 11/2006 |

(Continued)

OTHER PUBLICATIONS

Mazurkiewicz, John, "Load Intertia and Motor Selection", Baldor Electric, Table 1.*

(Continued)

*Primary Examiner* — Philip J Bonzell
*Assistant Examiner* — Nicholas McFall
(74) *Attorney, Agent, or Firm* — Lerner, David, Littenberg, Krumholz & Mentlik, LLP

(57) ABSTRACT

The rotors of a helicopter are directly connected with electric high-torque motors, and are powered by the latter. Energy generation and rotor drive are separate from each other. The high-torque motor of the main rotor is pivoted to the cabin canopy, so that it can be tilted together with the main rotor.

15 Claims, 7 Drawing Sheets

(51) Int. Cl.
*B64C 27/52* (2006.01)
*B64C 27/82* (2006.01)
*B64D 27/24* (2006.01)
*B64C 27/72* (2006.01)

(56) References Cited

U.S. PATENT DOCUMENTS

| | | | |
|---|---|---|---|
| 2,462,201 A | 2/1949 | Kilgore et al. | |
| 2,514,822 A | 7/1950 | Wolfe | |
| 3,332,404 A | 7/1967 | Lovercheck | |
| 3,332,643 A | 7/1967 | Toner | |
| 4,554,989 A | 11/1985 | Gruich et al. | |
| 4,601,444 A | 7/1986 | Lindenbaum | |
| 4,605,185 A | 8/1986 | Reyes | |
| 4,702,437 A * | 10/1987 | Stearns, Jr. | 244/17.11 |
| 4,703,906 A | 11/1987 | Eickmann | |
| 4,953,811 A * | 9/1990 | Smith | 244/17.19 |
| 4,955,560 A * | 9/1990 | Nishina et al. | 244/53 R |
| 5,174,523 A | 12/1992 | Balmford | |
| 5,219,143 A * | 6/1993 | Staple et al. | 248/550 |
| 5,390,543 A * | 2/1995 | Staple et al. | 73/583 |
| 6,171,055 B1 | 1/2001 | Vos et al. | |
| 6,568,633 B2 | 5/2003 | Dunn | |
| 6,609,378 B2 | 8/2003 | Scott | |
| 7,011,274 B1 | 3/2006 | Hardoin | |
| 7,147,072 B2 | 12/2006 | Botti | |
| 7,472,863 B2 | 1/2009 | Pak | |
| 7,857,254 B2 | 12/2010 | Parks | |
| 8,056,344 B2 | 11/2011 | Remy et al. | |
| 8,152,096 B2 | 4/2012 | Smith | |
| 8,453,962 B2 | 6/2013 | Shaw | |
| 2002/0005456 A1 | 1/2002 | Toulmay | |
| 2003/0085319 A1 | 5/2003 | Wagner et al. | |
| 2003/0230671 A1 | 12/2003 | Dunn | |
| 2004/0007644 A1 | 1/2004 | Phelps et al. | |
| 2005/0045762 A1 | 3/2005 | Pham | |
| 2006/0027701 A1 | 2/2006 | Eglin | |
| 2006/0048988 A1 | 3/2006 | Dreibholz et al. | |
| 2006/0060693 A1 | 3/2006 | Poltorak | |
| 2006/0138278 A1 | 6/2006 | Gans | |
| 2006/0185356 A1 | 8/2006 | O'Brien | |
| 2006/0231676 A1 * | 10/2006 | Kusic | 244/17.11 |
| 2008/0006739 A1 | 1/2008 | Mochida et al. | |
| 2008/0035786 A1 | 2/2008 | Bilyk et al. | |
| 2008/0145220 A1 * | 6/2008 | Yeh et al. | 416/23 |
| 2008/0179452 A1 * | 7/2008 | Kinkopf et al. | 244/24 |
| 2008/0184906 A1 | 8/2008 | Kejha | |
| 2009/0140095 A1 | 6/2009 | Sirohi et al. | |
| 2009/0145998 A1 | 6/2009 | Salyer | |
| 2009/0293494 A1 | 12/2009 | Hoffjann et al. | |
| 2010/0012223 A1 | 1/2010 | Yoshida | |
| 2010/0038473 A1 | 2/2010 | Schneider et al. | |
| 2010/0044498 A1 | 2/2010 | Palcic et al. | |
| 2010/0072318 A1 | 3/2010 | Westenberger | |
| 2010/0123039 A1 | 5/2010 | Buhl et al. | |
| 2010/0127114 A1 | 5/2010 | Nakayama et al. | |
| 2010/0230547 A1 * | 9/2010 | Tayman | 244/7 C |
| 2011/0031355 A1 | 2/2011 | Alvarez | |
| 2011/0073717 A1 | 3/2011 | Foucault et al. | |
| 2011/0108663 A1 | 5/2011 | Westenberger | |
| 2011/0147511 A1 | 6/2011 | Poltorak | |
| 2012/0056040 A1 | 3/2012 | Brotherton-Ratcliffe et al. | |
| 2012/0234968 A1 | 9/2012 | Smith | |
| 2012/0256042 A1 | 10/2012 | Altmikus et al. | |
| 2013/0062455 A1 | 3/2013 | Lugg et al. | |

FOREIGN PATENT DOCUMENTS

| | | |
|---|---|---|
| CN | 101628627 A | 1/2010 |
| DE | 1581060 B1 | 9/1969 |
| DE | 2628274 A1 | 1/1978 |
| DE | 102004044646 A1 | 3/2006 |
| DE | 102004043589 A1 | 4/2006 |
| DE | 102005046729 A1 | 4/2007 |
| DE | 102006056354 A1 | 6/2008 |
| DE | 102006056356 A1 | 6/2008 |
| DE | 202007006976 U1 | 9/2008 |
| DE | 102007013732 A1 | 10/2008 |
| DE | 102008014404 A1 | 10/2009 |
| DE | 102008028866 A1 | 12/2009 |
| DE | 102008046486 A1 | 3/2010 |
| DE | 102008057715 A1 | 5/2010 |
| EP | 1630097 A1 | 3/2006 |
| EP | 2159903 A2 | 3/2010 |
| FR | 2931456 A1 | 11/2009 |
| GB | 2419122 A | 4/2006 |
| JP | 05193581 A | 8/1993 |
| JP | 1999-147499 | 6/1999 |
| WO | 03106259 A2 | 12/2003 |
| WO | 2006113877 A2 | 10/2006 |
| WO | 2008086774 A2 | 7/2008 |
| WO | 2008138972 A1 | 11/2008 |
| WO | 2009025231 A1 | 2/2009 |
| WO | 2009153236 A2 | 12/2009 |
| WO | 2010106343 A2 | 9/2010 |

OTHER PUBLICATIONS

Chinese Office Action for Application No. 201180024796.9 dated Jun. 4, 2014 (English Summary provided.).

* cited by examiner

DRIVE SYSTEM FOR HELICOPTERS

CROSS-REFERENCE TO RELATED APPLICATIONS

The present application is a continuation of International Application No. PCT/EP2011/058120, filed May 19, 2011, published in German, which claims priority from German Patent Application No. 10 2010 021 024.2, filed on May 19, 2010, the disclosures of which are incorporated herein by reference.

FIELD OF THE INVENTION

The invention relates to helicopter drives. In particular, the invention relates to a main rotor drive for a helicopter, a tail rotor drive for a helicopter, a helicopter with a main rotor drive and/or a tail rotor drive, the use of such drives in helicopters as well as a method for powering a main rotor of a helicopter.

BACKGROUND OF THE INVENTION

Contemporary helicopters often exhibit a low efficiency of the drive system. In addition, the drive is often very loud. The main gear units have a fixed transmission ratio, are often relatively expensive, and have a limited torque capacity.

The drive train in known helicopters comprises an internal combustion engine and a mechanical main gear unit. Turbine shaft drives or reciprocating piston engines are frequently used.

DE 10 2008 028 866 A1 as well as WO 2009/153236 A2 describe a helicopter with a swashplate actuator.

SUMMARY OF THE INVENTION

A first aspect of the invention indicates a main rotor drive for a helicopter (chopper), which comprises an electric motor for directly powering the main rotor of the helicopter. The electric motor is a high-torque engine.

For example, the speed of the main rotor can be set within a large interval in this way. The highly variable speed of the rotor makes it possible to optimize the energy consumption. In addition, the performance and emission characteristics of the helicopter can be optimized. Because the rotor is directly powered, additional mechanical elements, such as the clutch or swashplate, can be simplified in design or omitted entirely.

Another aspect of the invention indicates a tail rotor drive for a helicopter that also comprises an electric motor for directly powering the tail rotor of the helicopter, wherein the electric motor is a high-torque motor. For example, the tail rotor drive is mechanically decoupled from the main rotor drive as a result.

Another aspect of the invention indicates a helicopter with a main rotor drive described above and below, and/or a tail rotor drive described above and below.

Another aspect of the invention indicates the use of a main rotor drive described above and below and/or a tail rotor drive described above and below in a helicopter.

Another aspect of the invention indicates a method for powering a main rotor and/or a tail rotor of a helicopter, in which the main rotor and/or tail rotor of the helicopter is directly powered by a respectively corresponding electric high-torque motor.

One core aspect of the invention can be regarded as involving an electric motor that directly powers the main rotor or tail rotor. In principle, this makes it possible to move, for example tilt, the electric motor along with the corresponding rotor. Since each rotor is powered by an electric motor, the speeds can be varied within a large speed range. A clutch is not required.

Therefore, the rotors can be powered with electric high-torque motors. In one embodiment of the invention, the electric high-torque motor is a low-inertia direct drive with a high power density. DE 10 2007 013 732 A1 describes one example for such a direct drive.

In another embodiment of the invention, the rotors of these electric motors are disk-shaped. The motors can be highly redundant in design. To this end, a plurality of stators and rotors can be axially arranged. These axially arranged stators and rotors can be connected with the main rotor shaft or tail rotor rim or tail rotor shaft. In another embodiment of the invention, the coils of the stators can additionally be divided up and supplied by allocated individual power electronic components.

In another embodiment of the invention, the main rotor drive further comprises a mounting device for hinging the electric motor to a helicopter cell (i.e., the supporting structure of the helicopter, for example in the area of the cockpit canopy), so that the electric motor along with the main rotor can be pivoted relative to the helicopter cell.

In another embodiment of the invention, the mounting device is designed as a tilting mounting device with a tilting bearing and a tilting actuator. This makes it possible to tilt the motor and rotor together around an axis. For example, this axis can be an axis situated transverse to the longitudinal axis of the helicopter, so that the motor and rotor can be tilted toward the front and back.

In another embodiment of the invention, the mounting device is designed as a gimbaled mounting device. This makes it possible to tilt the rotor in all directions.

In another embodiment of the invention, the mounting device is designed to generate a specific oscillation mode of the electric motor in such a way that an out-of-phase oscillation can be generated, which is able to cancel an original oscillation. This makes it possible to compensate for undesired vibrations.

In another embodiment of the invention, the main rotor drive comprises an active flap controller to ameliorate vibrations of the main rotor and/or to effect primary control of the helicopter. The active flap controller is here to be understood as the unit comprised of control electronics and aerodynamic control elements (flaps). Accordingly, the rotor blades of the main rotor have servo flaps, which can be actively actuated by the control electronics.

In another embodiment of the invention, the helicopter, in addition to the main rotor drive and/or tail rotor drive, comprises a motor-generator unit, which is provided to generate electrical energy for operating the electric motor.

In another embodiment of the invention, this motor-generator unit is situated under the cabin; e.g., a cabin floor of the helicopter; however, it can also be arranged above the cabin.

In another embodiment of the invention, the electrical high-torque motor along with the main rotor can be pivoted relative to the helicopter cell while the helicopter is in flight.

In other embodiments of the invention, the tail rotor drive is designed so that it can pivot around a vertical axis or can pivot around the latter to achieve a vector control and/or provide a propulsion component.

Embodiments of the invention will be described below with reference to the figures.

DETAILED DESCRIPTION

The depictions in the figures are schematic and not to scale.

The same reference numbers are used in the following description of figures for identical or similar elements.

Figure 1:
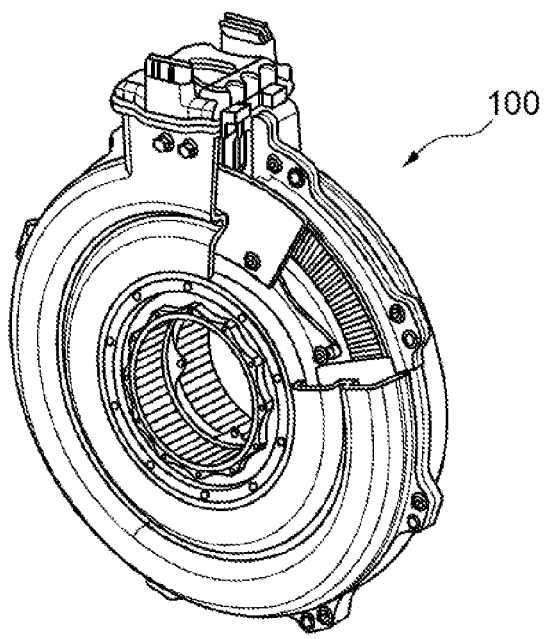
FIG. 1 shows an electric motor for a main rotor drive according to an embodiment of the invention.
Figure 2:
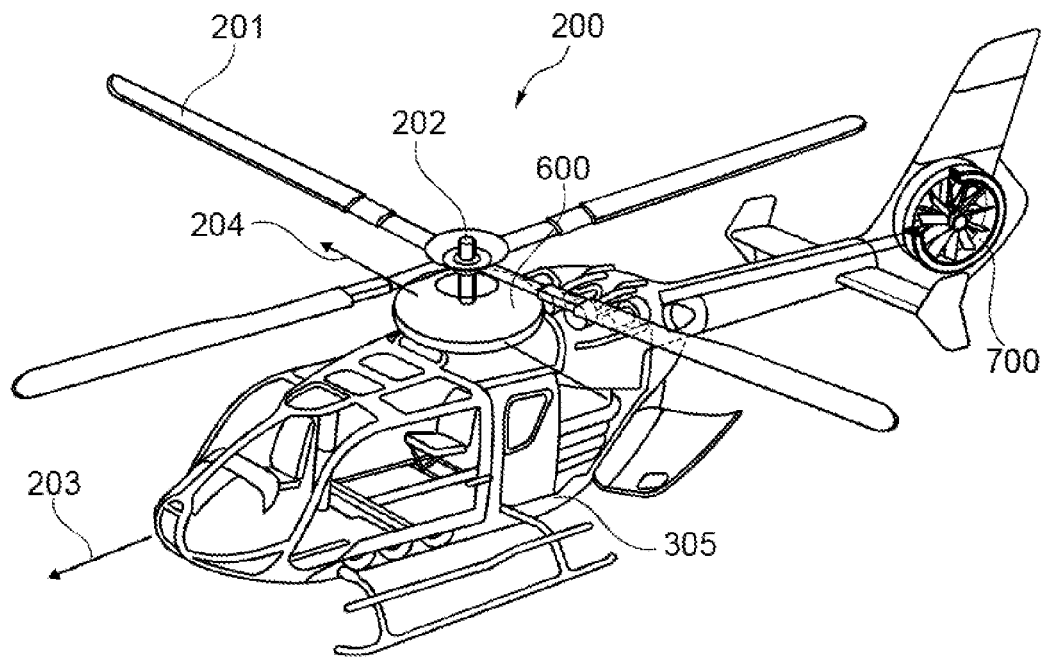
FIG. 2 shows a helicopter with a main rotor drive in a tail rotor drive according to an embodiment of the invention.

FIG. 1 shows an electric motor 100 (electromotor) for a main rotor drive of a helicopter. The main rotor or tail rotor can be directly powered with such an electric high-torque motor. The rotors in such an electric motor are disk-shaped, for example. The electric motor can be highly redundant in design. To this end, a plurality of stators and rotors is axially arranged and connected with the main rotor shaft or tail rotor rim. For example, this may be gleaned from FIG. 2, which depicts the arrangement of electric motors for the main and tail rotors.

The first electric motor of the main rotor drive 600 is directly connected with the main rotor 202 of the helicopter 200. In the example on FIG. 2, the main rotor 202 comprises four individual rotor blades 201.

Also provided in the tail of the helicopter is a second electric motor, which is directly connected with the tail rotor rim and forms an independent module 700.

The main rotor drive 600 is connected with the helicopter cell 305 by means of a corresponding mount.

The coils of the stators can be divided up and supplied by correspondingly allocated individual power electronic components.

The separation of energy generation and rotor drive permits a greater flexibility for the architecture. There is no longer a need for a tail rotor shaft the mounting of which involves considerable effort. In addition, a Fenestron arrangement prevents the shaft from disrupting the inflow toward the rotor. The vertical position of the tail rotor is also freely selectable.

Doing away with the rigid attachment of the rotor drive to the helicopter cell 305 makes it possible to pivot the rotor mast and entire electric motor, and hence the thrust vector, in the longitudinal direction of the helicopter 203 as needed (i.e., around the transverse axis 204). As a result, the large, resistance-increasing angular positioning of the fuselage normally required during forward flight can be avoided, along with the associated high blade root impact bend moments. For this purpose, the electric motor is hinged to the cockpit canopy. For example, this is shown on FIG. 3.

Figure 3:
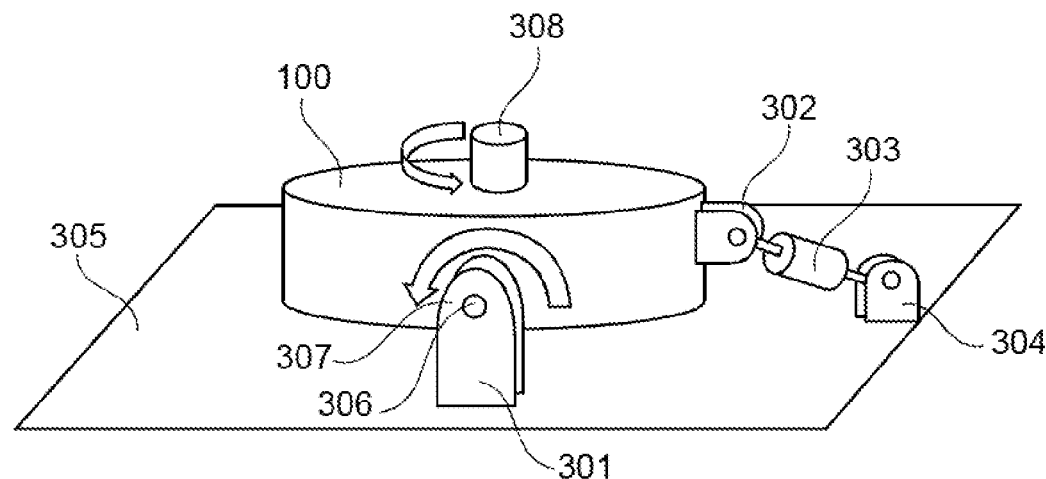
FIG. 3 shows a mounting device for a main rotor drive according to an embodiment of the invention.

Secured to the cabin canopy 305 (helicopter cell) is a tilting bearing 301, which e.g. consists of a transverse axis 306 and corresponding lateral suspension brackets 307 (wherein only one of the two lateral suspension brackets is visible on FIG. 3).

The electric motor 100 is suspended on the transverse axis 306, and can be tilted around this transverse axis. The rotor mast 308 is made to rotate by the electric motor 100, and is also tilted along with the electric motor 100 around the axis 306.

In order to control the tilting process, at least one tilting actuator 303 is provided, which is connected with the cabin canopy 305 via the suspension bracket 304, and with the housing of the electric motor 100 via the suspension bracket 302.

For example, the tilting angle moves between 0 degrees and about 15 degrees toward the front (and/or back). It can be increased if needed. It is also possible to provide a gimbaled suspension bracket for the rotor/drive unit, so that the electric motor 100 along with the main rotor can be tilted in all directions.

A rudder on the elevator unit makes it possible to angularly position the helicopter fuselage with the least resistance. Given a conventional configuration, this would induce high mast moments, which can be avoided by the forward tilting of the rotor.

In order to reduce the oscillations conveyed by the rotor to the electric motor, the tilting actuators and tilting bearings can be provided as active, dynamic components with a high dynamic bandwidth. They excite specific oscillation modes for the motor in such a way that an out-of-phase oscillation arises, which can cancel the original oscillation.

The vibration generated by the rotor can be additionally diminished by an active flap controller.

Figure 4:
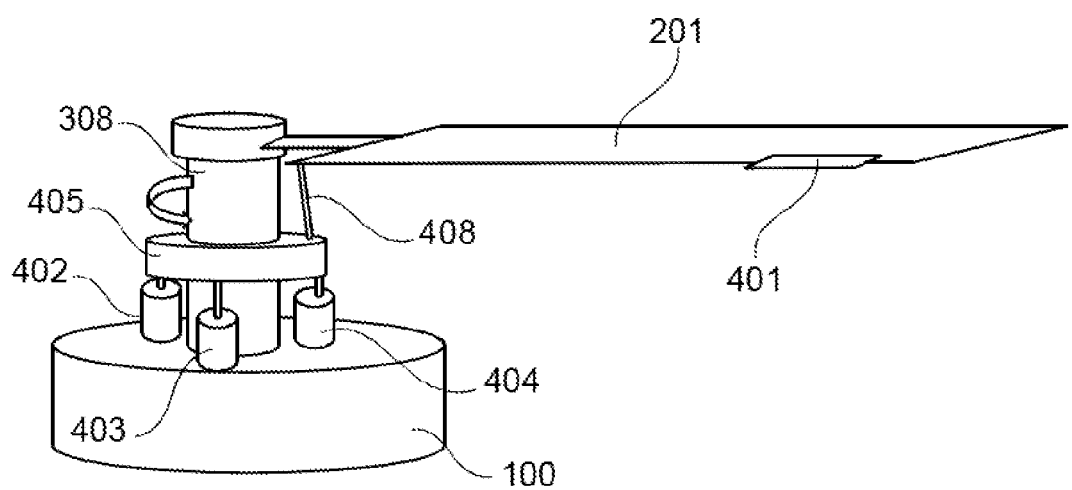
FIG. 4 shows a flap controller according to an embodiment of the invention.

FIG. 4 depicts such a flap controller. The latter can be used to dampen vibration or support the conventional primary controller. In the latter instance, it permits a smaller configuration for the classic control actuators 402, 403, 404 of the fixed system by comparison to conventional control systems (i.e., under the "swashplate" 405). These actuators are preferably, but not necessarily electrical in design.

At least one flap 401 is provided per blade. During vibration attenuation, the active flap controller generates additional vibrations, which counteract the original vibrations. Their frequency $f_K$ lies at the rotor rotational frequency $\Omega$*blade number b multiplied by an integral factor n:

$$f_K = \Omega * b * n$$

When effecting primary control via the servo flap 401 supported by control actuators 402, 403, 404 in the fixed system, the control rod system no longer handles the transmission of the control signals coming from the pilot. Instead, it takes place electrically. This prevents disruptions in the control signal caused by movements of the electric motor 100. The flaps 401 are preferably powered piezoelectrically. To this end, the length of piezo actuators mounted in the blade is statically and dynamically altered by varying the applied voltage. This motion is converted into a rotational movement around the flap control axis. The voltage signal is delivered by a control computer.

If the objective is to enlarge the pitch angle of the rotor blade, the servo flap is upwardly deployed. The inflow thereby presses down the tail edge of the blade, as a result of which the desired effect is achieved. In order to reduce the blade pitch angle, the servo flap is downwardly deployed accordingly.

Figure 5:
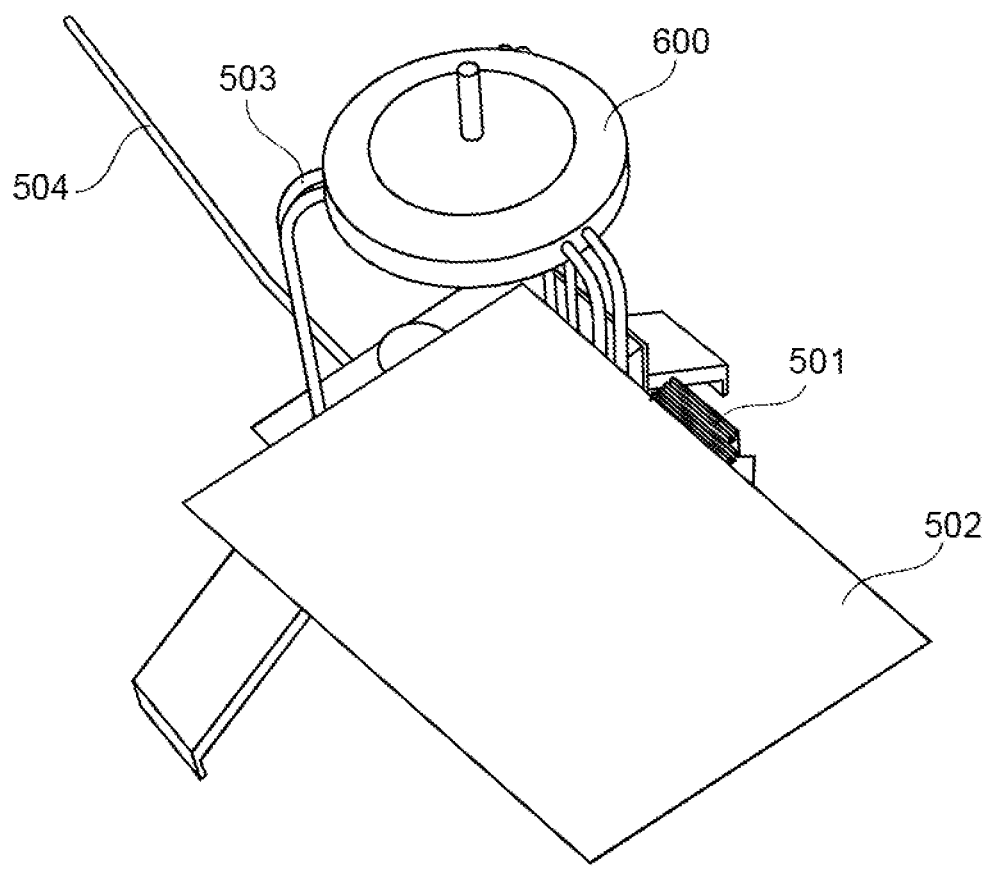
FIG. 5 shows the arrangement of system components according to an embodiment of the invention.

The electric motor 100 is supplied with energy by means of a motor-generator unit 501, which is accommodated under the cabin floor 502 of the helicopter (see FIG. 5).

The main rotor drive 600 and tail rotor drive (not shown in FIG. 5) are connected with the motor-generator unit 501 via electrical lines 503, 504.

For example, the motor in the motor-generator unit 501 is a reciprocating piston engine or a turbine in combination with generators and an accumulator device for storing the generated electrical energy.

Figure 6A:
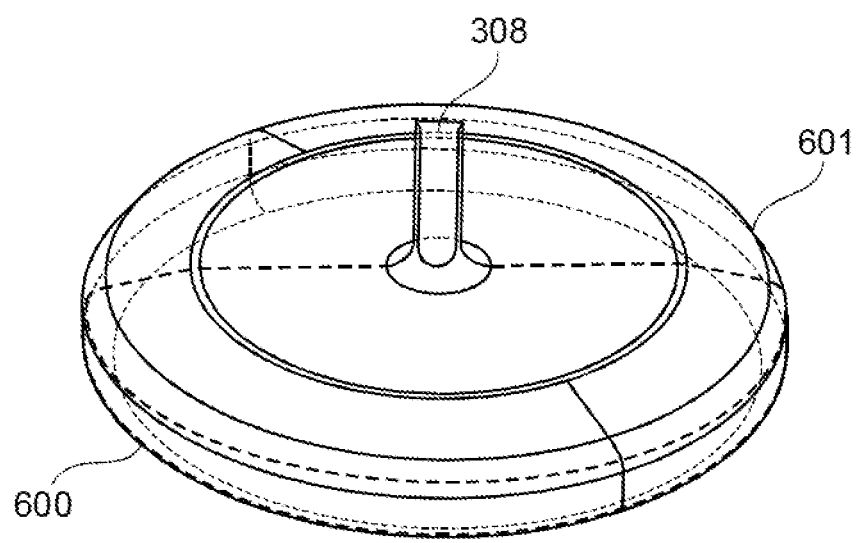
FIG. 6A shows a main rotor drive according to an embodiment of the invention.

FIG. 6A depicts a main rotor drive 600 with the rotor mast 308 and a housing 601.

Figure 6B:
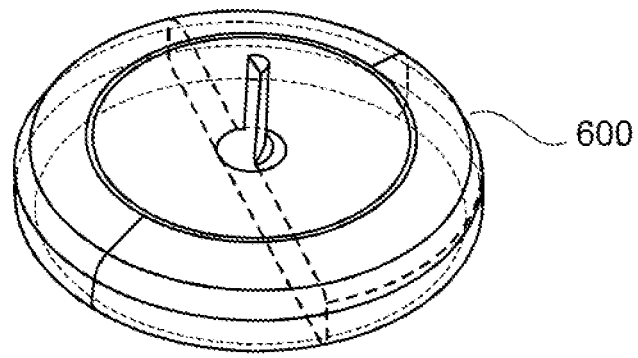
FIG. 6B shows another depiction of the main rotor drive from FIG. 6A.

FIG. 6B depicts the main rotor drive 600 from another perspective.

Figure 6C:
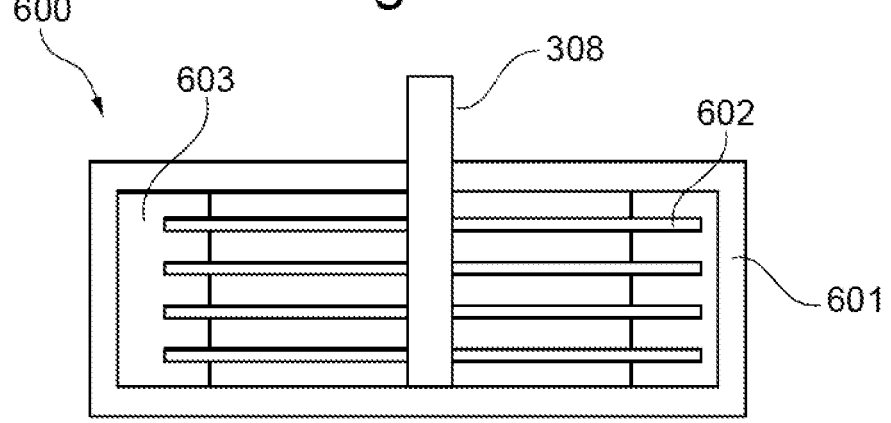
FIG. 6C shows a sectional view of the main rotor drive from FIG. 6A.

FIG. 6C presents a sectional view through the main rotor drive 600. A housing 601 is provided which comprises an upper opening through which the rotor mast 308 is guided. The rotor mast 308 is connected with a plurality (for example, four) disk-shaped rotors 602 of the electric motor. Embedded in the housing 601 are corresponding stators 603, which power the rotors 602, and hence the rotor mast 308.

Figure 7:
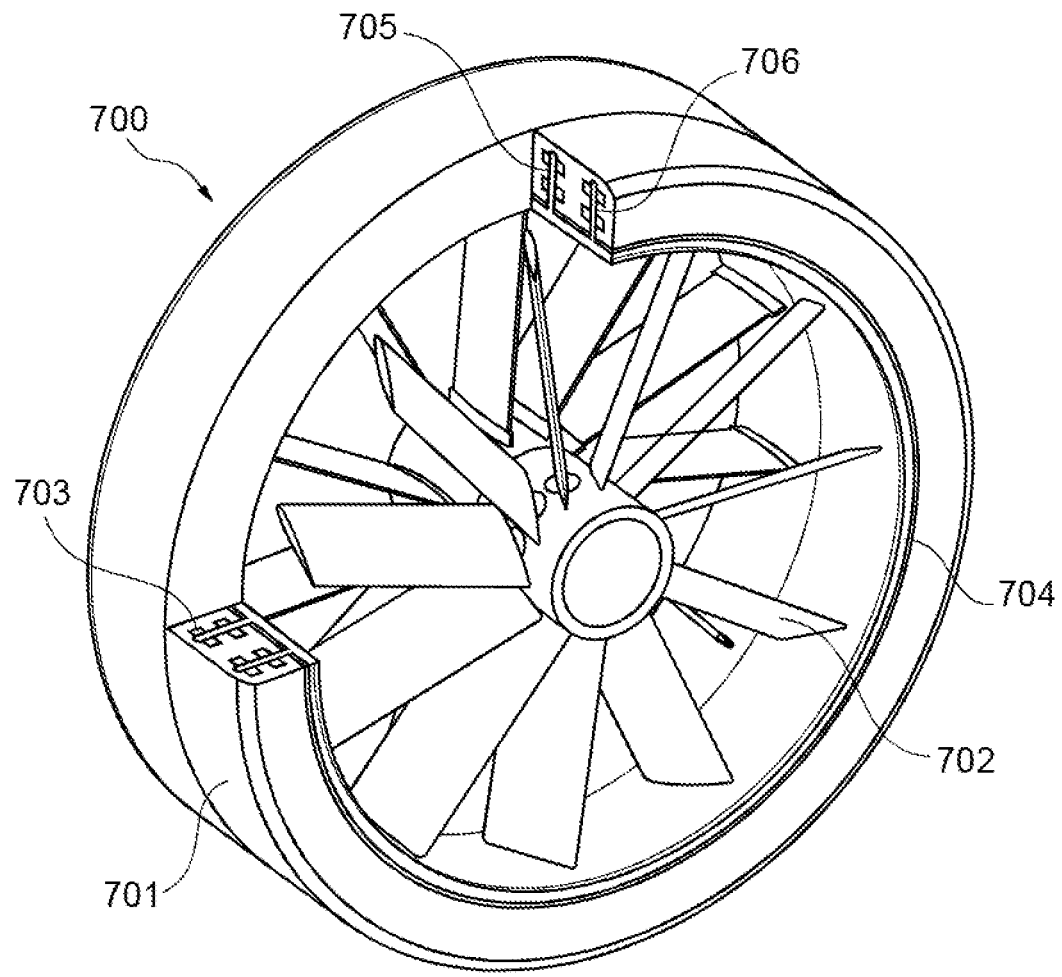
FIG. 7 shows a tail rotor drive according to an embodiment of the invention.

FIG. 7 depicts a tail rotor drive 700 with a jacketed design according to an embodiment of the invention. The individual rotor blades 702 of the tail rotor can be fixedly clamped between an inner and an outer ring 704. The tail rotor outer ring 704 in conjunction with several webs 705, 706 (for example, two situated perpendicular to the outer ring 704) then represents the electric rotor. The webs are embedded into the coils 703 of the stator and the motor housing 701. The tail rotor thrust is controlled by the rotary speed.

The inner ring is omitted in another embodiment. The tail rotor thrust can again be controlled by the rotary speed, or by adjusting the rotor blades around their longitudinal axis.

In yet another arrangement, the blades are only attached to the inner ring, which then becomes part of the electrical rotor of a hub drive. Here as well, the tail rotor thrust can again be controlled by the rotary speed, or by adjusting the rotor blades around their longitudinal axis.

Figure 8:
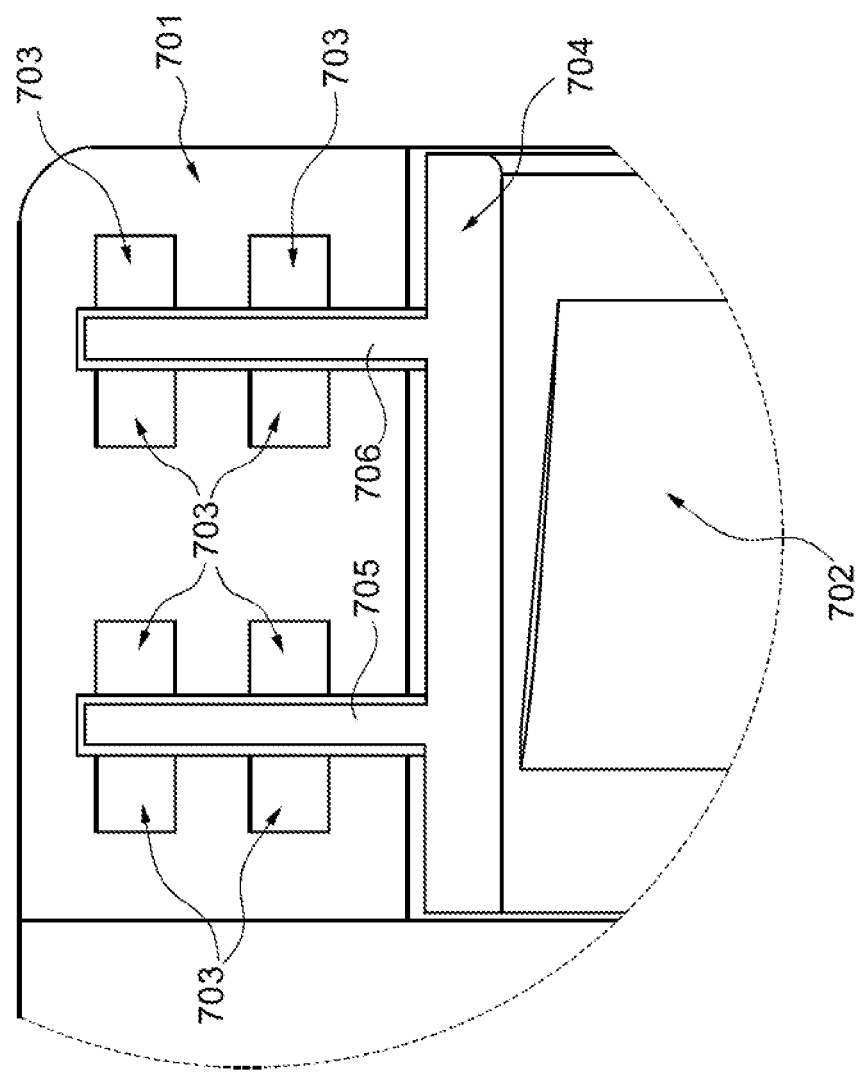
FIG. 8 shows a sectional view of part of the tail rotor drive from FIG. 7.

FIG. 8 presents a cross sectional view of part of the tail rotor drive. As evident from FIG. 8, the outer ring 704 of the tail rotor is arranged with its two webs (rotors) 705, 706 between the coils 703. The rotor blade 702 of the tail rotor is moved by the outer ring 704 of the tail rotor, and is connected thereto. The stator and motor housing are situated in area 701.

In general, the tail rotor can be designed as open or jacketed ("Fenestron"). For example, FIG. 8 depicts a tail rotor drive with an open design, in this case with an electric hub drive, i.e., the electromotor is fixedly joined with the tail rotor mast.

Figure 9:
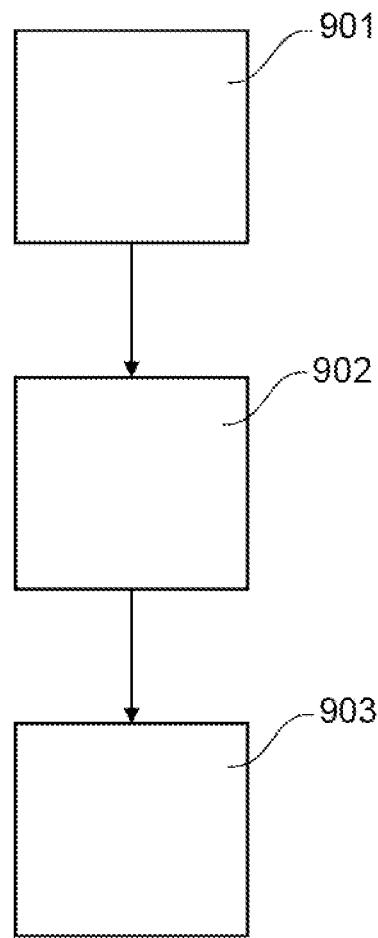
FIG. 9 shows a flowchart for a method according to an embodiment of the invention.

FIG. 9 presents a flowchart for a method according to an embodiment of the invention. Electrical energy is generated in step 901 by way of an internal combustion engine and a generator. In step 902, this electrical energy is used for powering electric high-torque motors for the main rotor and the tail rotor of the helicopter. In step 903, the electric high-torque motor of the main rotor is pivoted relative to the helicopter cell while the helicopter is in flight so as to accelerate the helicopter.

In addition, let it be noted that "encompassing" and "comprising" do not preclude other elements or steps, and that "an" or "a" do not rule out a plurality. Let it further be noted that features or steps that were described with reference to one of the above exemplary embodiments can also be used in combination with other features or steps from other embodiments described above. Reference numbers in the claims are not to be construed as limitations.

LIST OF REFERENCE SIGNS

100 Electric motor
200 Helicopter
201 Rotor blades
202 Main rotor
203 Longitudinal direction
204 Transverse direction
301 Tilting bearing
302 Suspension bracket
303 Tilting actuator
304 Suspension bracket
305 Helicopter cell
306 Transverse axis
307 Suspension bracket
308 Rotor mast
401 Servo flap
402 Control actuator
403 Control actuator
404 Control actuator
405 Swashplate
408 Control rod
501 Generator unit
502 Cabin floor
503 Line pair
504 Line
600 Main rotor drive
601 Housing
602 Rotors
603 Stators
700 Tail rotor drive
701 Motor housing
702 Rotor blades
703 Coils
704 Outer ring
705 Web
706 Web
901 Step 1
902 Step 2
903 Step 3

The invention claimed is:

1. A main rotor drive for a helicopter, the main rotor drive comprising:
    an electric motor for directly powering a main rotor of the helicopter; and
    a mounting device for hinging the electric motor to a helicopter cell;
    wherein the mounting device is configured to allow the electric motor along with the main rotor to be pivoted relative to the helicopter cell; and
    wherein the mounting device comprises a tilting mounting device with a tilting bearing and a tilting actuator,
    wherein the tilting bearing comprises a transverse axis from which the electric motor is suspended; and
    wherein the electric motor is configured to be tilted around the transverse axis.

2. The main rotor drive of claim 1, wherein the electric motor comprises a plurality of stators and rotors arranged axially.

3. The main rotor drive of claim 1, wherein the mounting device comprises a gimbaled mounting device.

4. The main rotor drive of claim 1, further comprising: an active flap controller for diminishing the vibrations of the main rotor.

5. A main rotor drive for a helicopter, the main rotor drive comprising:
    an electric motor for directly powering a main rotor of the helicopter; and
    a mounting device for hinging the electric motor to a helicopter cell;

wherein the mounting device is configured to allow the electric motor along with the main rotor to be pivoted relative to the helicopter cell, wherein the mounting device is configured to excite a specific oscillation mode of the electric motor, wherein the mounting device is configured to generate an anti-phase oscillation for canceling an original oscillation, and, wherein the mounting device comprises a tilting mounting device with a tilting bearing and a tilting actuator.

6. The main rotor drive of claim 5, wherein the electric motor comprises a plurality of stators and rotors arranged axially.

7. The main rotor drive of claim 5, wherein the mounting device comprises a gimbaled mounting device.

8. The main rotor drive of claim 5, further comprising: an active flap controller for diminishing the vibrations of the main rotor.

9. A tail rotor drive for a helicopter, the tail rotor drive comprising:
a motor housing comprising an inner ring and an outer ring;
an electric motor for directly powering a tail rotor of the helicopter;
wherein rotor blades of the tail rotor are clamped between the inner ring and the outer ring, and
wherein the tail rotor drive is configured to pivot around a vertical axis to achieve a vector control.

10. A helicopter comprising at least one of a main rotor drive and a tail rotor drive wherein the main rotor drive comprises:
an electric motor for directly powering a main rotor of the helicopter; and
a mounting device for hinging the electric motor to a helicopter cell;
wherein the mounting device is configured to allow the electric motor along with the main rotor to be pivoted relative to the helicopter cell; and
wherein the mounting device is configured to excite a specific oscillation mode of the electric motor, wherein the mounting device is configured to generate an anti-phase oscillation for canceling an original oscillation;
wherein the tail rotor drive comprises:
an electric motor for directly powering a tail rotor of the helicopter;
wherein the tail rotor drive is configured to pivot around a vertical axis to achieve a vector control.

11. The helicopter of claim 10, further comprising: a motor-generator unit for generating electric energy to operate the electric motors.

12. The helicopter of claim 11, wherein the motor-generator unit is arranged under the cabin of the helicopter.

13. A method for powering at least one of a main rotor and a tail rotor of a helicopter, the method comprising:
directly powering the main rotor of the helicopter or the tail rotor of the helicopter with an electric motor; and
pivoting the electric motor along with the main rotor relative to a helicopter cell around a transverse axis from which the electric motor is suspended; and
wherein the tail rotor drive is configured to pivot around a vertical axis to achieve a vector control.

14. The method of claim 13, further comprising: pivoting the electric motor along with the main rotor relative to the helicopter cell while the helicopter is in flight.

15. The method of claim 13, further comprising: pivoting the tail rotor around a vertical axis to achieve a vector control.

* * * * *